United States Patent
Kasuya et al.

(10) Patent No.: US 9,157,667 B2
(45) Date of Patent: Oct. 13, 2015

(54) HEAT PUMP-TYPE HEATING DEVICE

(75) Inventors: Junichiro Kasuya, Isesaki (JP); Yasuaki Kanou, Isesaki (JP); Syou Ishii, Isesaki (JP)

(73) Assignee: SANDEN CORPORATION, Gunma (JP)

(*) Notice: Subject to any disclaimer, the term of this patent is extended or adjusted under 35 U.S.C. 154(b) by 348 days.

(21) Appl. No.: 13/883,479

(22) PCT Filed: Sep. 20, 2011

(86) PCT No.: PCT/JP2011/071324
§ 371 (c)(1),
(2), (4) Date: May 3, 2013

(87) PCT Pub. No.: WO2012/060164
PCT Pub. Date: May 10, 2012

(65) Prior Publication Data
US 2013/0227979 A1     Sep. 5, 2013

(30) Foreign Application Priority Data
Nov. 4, 2010 (JP) ................. 2010-247755

(51) Int. Cl.
| | |
|---|---|
| *F25B 7/00* | (2006.01) |
| *F25B 1/00* | (2006.01) |
| *F25B 49/02* | (2006.01) |
| *F25B 6/04* | (2006.01) |
| *F25B 9/00* | (2006.01) |
| *F25B 30/02* | (2006.01) |

(52) U.S. Cl.
CPC ... *F25B 7/00* (2013.01); *F25B 1/00* (2013.01); *F25B 6/04* (2013.01); *F25B 9/008* (2013.01); *F25B 30/02* (2013.01); *F25B 49/02* (2013.01); *F25B 2309/061* (2013.01)

(58) Field of Classification Search
CPC ............ F25B 7/00; F25B 9/008; F25B 30/02; F25B 49/02; F25B 2309/06; F25B 2309/061
USPC .......................................................... 62/175
See application file for complete search history.

(56) References Cited

U.S. PATENT DOCUMENTS

| | | | |
|---|---|---|---|
| 5,241,829 A * | 9/1993 | Irie et al. ........................... | 62/79 |
| 6,494,054 B1 | 12/2002 | Wong et al. | |

(Continued)

FOREIGN PATENT DOCUMENTS

| | | | |
|---|---|---|---|
| GB | 2515719 A * | 1/2015 | |
| JP | 62-77554 | 4/1987 | |

(Continued)

*Primary Examiner* — Marc Norman
(74) *Attorney, Agent, or Firm* — Cozen O'Connor

(57) ABSTRACT

A unitary-side heat pump unit is configured so that a refrigerant circulates sequentially through a first compressor, a first heat exchanger, a cascade heat exchanger, a first expansion valve and an evaporator, and heat exchange with heat media of a heating unit is carried out in the first heat exchanger; a binary-side heat pump unit is configured so that a refrigerant circulates sequentially through a second compressor, a second heat exchanger, a second expansion valve and a cascade heat exchanger, and heat exchange with heat media of the heating unit is carried out in the second heat exchanger; the refrigerants of the unitary-side and binary-side heat pump units include carbon dioxide ($CO_2$) as a main component; and high pressure-side sections of the unitary-side and binary-side heat pump units are activated within substantially identical pressure ranges of supercritical pressure.

12 Claims, 10 Drawing Sheets

(56) References Cited

U.S. PATENT DOCUMENTS

2007/0271936 A1* 11/2007 Wakamoto et al. ............. 62/160
2010/0147006 A1* 6/2010 Taras et al. ...................... 62/335
2012/0216551 A1* 8/2012 Minor et al. ....................... 62/79

FOREIGN PATENT DOCUMENTS

| | | |
|---|---|---|
| JP | 4 263758 | 9/1992 |
| JP | 2000-320914 | 11/2000 |
| JP | 2006-71129 | 3/2006 |
| JP | 2007-3169 | 1/2007 |
| JP | 2010-276230 | 12/2010 |
| JP | 2013228122 A * | 11/2013 |
| WO | WO 82/02588 | 8/1982 |
| WO | WO 2007/046332 | 4/2007 |
| WO | WO 2008/150289 | 12/2008 |
| WO | WO 2013111786 A1 * | 8/2013 |

* cited by examiner

HEAT PUMP-TYPE HEATING DEVICE

RELATED APPLICATIONS

This is a U.S. national stage of International application No. PCT/JP2011/071324 filed on Sep. 20, 2011.

This patent application claims the priority of Japanese application no. 2010-247755 filed Nov. 4, 2010, the disclosure content of which is hereby incorporated by reference.

TECHNICAL FIELD

The present invention relates to a heat pump-type heating device, and more specifically, to a technology of improving COP by using a heat pump having a binary compression refrigeration circuit to perform heating.

BACKGROUND ART

It is known to use a refrigeration unit having a binary compression refrigeration circuit to create low or high temperature within a vapor compression refrigeration circuit.

Units having such a binary compression refrigeration circuit include, for example, the refrigeration unit described in Patent Document 1. In this refrigeration unit, a low temperature-side refrigeration circuit is formed of a compressor, a condensation section of a cascade heat exchanger, an expansion valve and an evaporator, which are connected in order using refrigerant pipes, and a high temperature-side refrigeration circuit is formed of a compressor, a condenser, an expansion valve and an evaporation section of the cascade heat exchanger, which are connected in order using refrigerant pipes.

Generally, in a refrigeration circuit, the compressor efficiency is deteriorated in proportion of increase of a compression ratio. In particular, a unitary compression refrigeration circuit compresses and delivers refrigerant from the evaporator located on a low temperature-side section of the circuit to the condenser located on a high temperature-side section at one time at a high compression ratio, so that the compressor efficiency is not good. By contrast, if the binary compression refrigeration circuit is used, the compression ratio of the compressor of the high temperature-side refrigeration circuit and that of the compressor of the low temperature-side refrigeration circuit can be kept low, and the compressor efficiencies are improved.

For example, the hot-water supply system described in Patent Document 2 uses a binary compression refrigeration circuit, so that it is possible to perform high-temperature hot water supply through low temperature-side and high temperature-side refrigeration circuits, and even properly perform mid-temperature hot water supply through the low-temperature refrigeration circuit.

For example, the heat-pump hot-water supply system described in Patent Document 3 uses a binary compression refrigeration circuit, so that it is possible to perform preheating through a low temperature-side refrigeration circuit and also perform high-temperature hot water supply through the low temperature-side refrigeration circuit and a high temperature-side refrigeration circuit.

PRIOR ART DOCUMENT

Patent Document

Patent Document 1: Unexamined Japanese Patent Publication (Kokai) No. 2000-320914

Patent Document 2: Unexamined Japanese Patent Publication (Kokai) No. 62-77554

Patent Document 3: Japanese Patent No. 2554208

SUMMARY OF THE INVENTION

Problems to be Solved by the Invention

In the case that a binary compression refrigeration circuit is formed of a low temperature-side refrigeration circuit and a high temperature-side refrigeration circuit with a cascade heat exchanger intervening therebetween, as shown in FIG. 10 of a conventional common Mollier chart (solid line) of the binary compression refrigeration circuit, in comparison with a unitary compression refrigeration circuit (broken line), when low temperature is desired (low temperature-side refrigeration circuit), enthalpy difference is increased, and low temperature can be satisfactory created. However, when high temperature is desired (high temperature-side refrigeration circuit), the enthalpy difference is decreased. As a result, high temperature output cannot be sufficiently obtained, and COP (coefficient of performance) is not improved.

The above problem frequently occurs especially when $CO_2$ is used as refrigerant to activate the refrigeration circuit within a supercritical pressure range because the decrease of the enthalpy difference is large in such a case, as shown in FIG. 11 of a Mollier chart showing a situation where $CO_2$ is used as refrigerant.

As shown by an arrow in FIG. 11, for example, if high temperature is desired as in a heater or the like (high temperature-side refrigeration circuit), the binary compression refrigeration circuit using $CO_2$ as refrigerant like the one mentioned above cannot efficiently use the heat in a range shown by the arrow, which is the heat (residual heat) that cannot be used directly for heating purpose due to its low temperature but has higher temperature than outside air temperature (heat absorption source) and is therefore usable as a heat absorption source of the refrigeration circuit.

The invention has been made in light of the above issue. It is an object of the invention to provide a heat pump-type heating device that sufficiently improves COP by using a binary compression refrigeration circuit.

Means for Solving the Problem

To accomplish the above object, the heat pump-type heating device of the invention has a heating unit that circulates heat media to a heating terminal; a unitary-side heat pump unit in which refrigerant circulates sequentially through a first compressor, a first heat exchanger, a cascade heat exchanger, a first expansion valve and an evaporator, and heat exchange with the heat media of the heating unit is carried out in the first heat exchanger; a binary-side heat pump unit in which refrigerant circulates sequentially through a second compressor, a second heat exchanger, a second expansion valve and a cascade heat exchanger, and heat exchange with heat media of a heating unit is carried out in the second heat exchanger; and a controller that controls the heating unit and the unitary-side and binary-side heat pump units. The refrigerants of the unitary-side and binary-side heat pump units include carbon dioxide as a main component. The controller activates both high pressure-side sections of the unitary-side and binary-side heat pump units within substantially identical pressure ranges of supercritical pressure (claim 1).

Preferably, the controller controls evaporation temperature of the refrigerant of the binary-side heat pump unit to be equal to or higher than evaporation temperature of the refrigerant of the unitary-side heat pump unit (claim 2).

The controller preferably controls the evaporation temperature of the refrigerant of the binary-side heat pump unit to be equal to or lower than a critical point and equal to or higher than predetermined temperature (claim 3).

The predetermined temperature is preferably 15 degrees centigrade (claim 4).

Preferably, when heating performance of the heating unit is insufficient, the controller controls the evaporation temperature of the refrigerant of the binary-side heat pump unit to be equal to or higher than the evaporation temperature of the refrigerant of the unitary heat pump unit and lower than the predetermined temperature (claim 5).

The binary-side heat pump unit preferably has a binary-side internal heat exchanging device that performs heating by carrying out heat exchange between the refrigerant that has passed through the cascade heat exchanger and the refrigerant existing between the second compressor and the second expansion valve (claim 6).

The unitary-side heat pump unit preferably has a unitary-side internal heat exchanging device that performs heating by carrying out heat exchange between the refrigerant that has passed through the evaporator and the refrigerant existing between the first compressor and the first expansion valve (claim 7).

Preferably, there is provided a temperature detecting device that detects the temperature of the refrigerant that has passed through the first compressor, and the controller controls a flow rate of the refrigerant that passes through the evaporator and undergoes the heat exchange in the unitary-side internal heat exchanging device so that the temperature of the refrigerant, which is detected by the temperature detecting device, becomes equal to predetermined temperature (claim 8).

Preferably, in addition to the heating unit, there is provided a thermal unit that circulates the heat media, and the refrigerant of the unitary-side heat pump unit undergoes heat exchange with the heat media circulating through the heating unit, whereas the refrigerant of the binary-side heat pump unit undergoes heat exchange with the heat media circulating through the thermal unit (claim 9).

Preferably, in addition to the heating unit, there is further provided a thermal unit that circulates the same heat media as the heat media of the heating unit, and the controller circulates the heat media that have undergone heat exchange with the refrigerant of the unitary-side heat pump unit, and circulates the heat media that have undergone heat exchange with the refrigerant of the binary-side heat pump unit, after dividing the heat media between the heating unit and the thermal unit (claim 10).

The thermal unit is preferably a hot-water supply unit (claim 11).

Advantageous Effects of the Invention

In the heat pump-type heating device of the invention, there are provided the heating unit, the unitary-side heat pump unit and the binary-side heat pump unit; the unitary-side heat pump unit is configured so that the refrigerant circulates sequentially through the first compressor, the first heat exchanger, the cascade heat exchanger, the first expansion valve and the evaporator, and heat exchange with the heat media of the heating unit is carried out in the first heat exchanger; the binary-side heat pump unit is configured so that the refrigerant circulates sequentially through the second compressor, the second heat exchanger, the second expansion valve and the cascade heat exchanger, and heat exchange with the heat media of the heating unit is carried out in the second heat exchanger; the refrigerants of the unitary-side and binary-side heat pump units include carbon dioxide ($CO_2$) as a main component; and the high pressure-side sections of the unitary-side and binary-side heat pump units are activated within substantially identical pressure ranges of supercritical pressure. Thus, both the unitary side and the binary side can create high temperature, so that the heating performance can be improved. The binary-side heat pump unit uses residual heat as a heat absorption source, which cannot be used directly for heating purpose in the unitary-side heat pump unit, but has higher temperature than outside air temperature, so that a compression ratio is lower, as compared to when outside air is used as a heat absorption source, and COP is well improved (claim 1).

When the evaporation temperature of the refrigerant of the binary-side heat pump unit becomes lower than the evaporation temperature of the refrigerant of the unitary-side heat pump unit, efficiency is deteriorated, as compared to when two heat pump units (unitary-side heat pump unit) that use outside air as a heat absorption source are operated in parallel. With the heat pump-type heating device of the invention however, such a deterioration in efficiency is prevented, and COP is well improved, since the evaporation temperature of the refrigerant of the binary-side heat pump unit is controlled to be equal to or higher than the evaporation temperature of the refrigerant of the unitary-side heat pump unit (claim 2).

Since the evaporation temperature of the refrigerant of the binary-side heat pump unit is controlled to be equal to or lower than a critical point and equal to or higher than predetermined temperature, COP is well improved (claim 3).

The predetermined temperature is set to 15 degrees centigrade, and the evaporation temperature of the refrigerant of the binary-side heat pump unit is controlled to be equal to or lower than the critical point and equal to higher than 15 degrees centigrade, so that COP is well improved (claim 4).

When the heating performance of the heating unit is insufficient, the evaporation temperature of the refrigerant of the binary-side heat pump unit is controlled to be equal to or higher than the evaporation temperature of the refrigerant of the unitary heat pump unit and lower than the predetermined temperature. As a result, even if the heating performance is insufficient, the heating performance can be sufficiently secured while minimizing efficiency deterioration (claim 5).

The binary-side heat pump unit includes the binary-side internal heat exchanging device that performs heating by carrying out heat exchange between the refrigerant that has passed through the cascade heat exchanger and the refrigerant existing between the second compressor and the second expansion valve. This increases enthalpy at an inlet and therefore outlet of the second compressor, so that the heating performance and thus COP is further improved (claim 6).

The unitary-side heat pump unit includes the unitary-side internal heat exchanging device that performs heating by carrying out heat exchange between the refrigerant that has passed through the evaporator and the refrigerant existing between the first compressor and the first expansion valve. This increases enthalpy at an inlet and therefore outlet of the first compressor, so that the heating performance and thus COP is further improved (claim 7).

There is provided the temperature detecting device that detects the temperature of the refrigerant that has passed through the first compressor, and the flow rate of the refrigerant that passes through the evaporator and undergoes the heat exchange in the unitary-side internal heat exchanging device is controlled so that the temperature of the refrigerant, which is detected by the temperature detecting device, becomes equal to predetermined temperature. This prevents the device from being damaged when the refrigerant that has passed through the first compressor is abnormally overheated (claim 8).

In addition to the heating unit, there is further provided the thermal unit that circulates the heat media, and the refrigerant of the unitary-side heat pump unit undergoes heat exchange with the heat media circulating through the heating unit, whereas the refrigerant of the binary-side heat pump unit undergoes heat exchange with the heat media circulating through the thermal unit. For that reason, the device can be used in not only the heating unit but also the thermal unit. In this case, the heat media circulating through the heating unit and the heat media circulating through the thermal unit can be set to different temperatures according to an operating condition of the unitary-side and binary-side heat pump units and that of the heating and thermal units (claim 9).

In addition to the heating unit, there is further provided a thermal unit that circulates the same heat media as the heat media of the heating unit, and the controller circulates the heat media that have undergone heat exchange with the refrigerant of the unitary-side heat pump unit, and circulates the heat media, which have undergone heat exchange with the refrigerant of the binary-side heat pump unit, after dividing the heat media between the heating unit and the thermal unit. The device therefore can be used in not only the heating unit but also the thermal unit. Since the heat, which is obtained through heat exchange with the refrigerant of the binary-side heat pump unit, is divided between the heating unit and the thermal unit, especially the performance of the heating unit is enhanced (claim 10).

As the thermal unit is also a hot-water supply unit, the device can be used in not only the heating unit but also the hot-water supply unit. Especially in the hot-water supply unit, low-temperature water is made into high-temperature water, so that enthalpy difference can be made large in the high pressure-side section of the binary-side heat pump unit, and the heat media (water) is efficiently heated (claim 11).

MODE FOR CARRYING OUT THE INVENTION

Aspects of a heat pump-type heating device of the present invention will be described below with reference to the attached drawings.

First Embodiment

Figure 1:
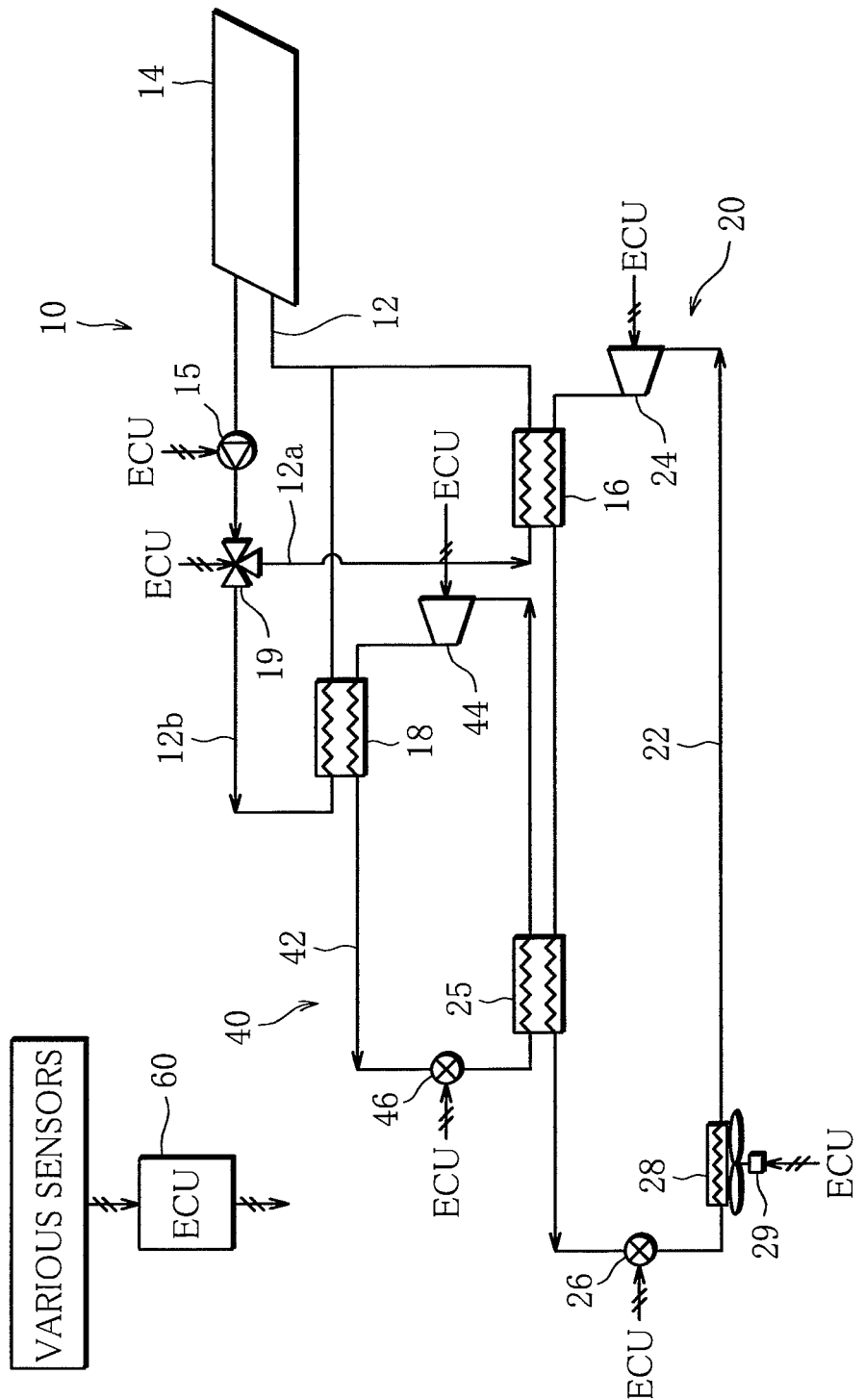
FIG. 1 is a schematic configuration view showing a heat pump-type heating device according to a first embodiment of the present invention.

FIG. 1 is a schematic configuration view showing a heat pump-type heating device according to a first embodiment of the invention.

The heat pump-type heating device of the first embodiment is made roughly of a heating unit 10, a unitary-side heat pump unit 20, and a binary-side heat pump unit 40. In short, in the heat pump-type heating device of the invention, the heat pump unit is made of a binary compression refrigeration circuit.

The heating unit 10 is configured so that, on a heat-medium circulation passage 12 through which heat media circulate, there are disposed a heating terminal 14, a hot-medium circulation pump 15, and a first heat exchanger 16 that carries out heat exchange with the unitary-side heat pump unit 20 in order of a direction the media flow as shown by solid arrows, and there is also disposed on a branch of the heat-medium circulation passage 12, a second heat exchanger 18 that carries out heat exchange with the binary-side heat pump unit 40. More specifically, the heating unit 10 is configured so that the heat-medium circulation passage 12 diverges into a first heat-medium circulation passage 12a and a second heat-medium circulation passage 12b, and then, the passages 12a and 12b join together. The first heat exchanger 16 is disposed on the first heat-medium circulation passage 12a, and the second heat exchanger 18 on the second heat-medium circulation passage 12b. In a bifurcation area of the first heat-medium circulation passage 12a and the second heat-medium circulation passage 12b, there is placed a flow-rate adjusting valve 19 that adjusts the flow rate of the heat media flowing through the first and second heat-medium circulation passage 12a and 12b.

The unitary-side heat pump unit 20 is configured so that, on a refrigerant circulation passage 22 through which the $CO_2$ refrigerant (carbon dioxide refrigerant) circulates, a compressor 24, the first heat exchanger 16, a cascade heat exchanger 25, an expansion valve 26 and an evaporator 28 are disposed in order of a direction the refrigerant flows as shown by solid arrows. The evaporator 28 is provided with a blast fan 29.

The binary-side heat pump unit 40 is configured so that, on the refrigerant circulation passage 42 through which the $CO_2$ refrigerant (that is carbon dioxide and will be referred to simply as refrigerant), a compressor 44, the second heat exchanger 18, an expansion valve 46 and the cascade heat exchanger 25 are disposed in order of a direction the refrigerant flows as shown by solid arrows.

The unitary-side heat pump unit 20 functions to make the refrigerant, which has passed through the expansion valve 26 and the evaporator 28 to be adiabatically expanded, absorb heat from outside air, compress the refrigerant by using the compressor 24 into a supercritical pressure range so that the refrigerant comes into a high-temperature and high-pressure state, carry out heat exchange between the high-temperature and high-pressure refrigerant and the heat media of the heating unit 10 in the first heat exchanger 16, and also carry out heat exchange between the high-temperature and high-pressure refrigerant and the refrigerant of the binary-side heat pump unit 40 in the cascade heat exchanger 25.

The binary-side heat pump unit 40 functions to make the refrigerant, which has passed through the expansion valve 46 and the cascade heat exchanger 25 to be adiabatically expanded, absorb heat from the refrigerant of the unitary-side heat pump unit 20, compress the refrigerant by using the compressor 44 into the supercritical pressure range so that the refrigerant comes into a high-temperature state and has high pressure that is in substantially identical pressure range as in the case of the unitary-side heat pump unit 20, and carry out heat exchange between the high-temperature and high-pressure refrigerant and the heat media of the heating unit 10 in the second heat exchanger 18.

The heat pump-type heating device is provided with an electronic control unit (ECU) (controller) 60 that controls in a comprehensive manner the heating unit 10, the unitary-side heat pump unit 20 and the binary-side heat pump unit 40. The ECU 60 is electrically connected to various sensors at an input side thereof, which include a temperature sensor and the like, and to various devices at an output side thereof, which include the pump 15 and the flow-rate adjusting valve 19 of the heating unit 10, the compressor 24, the expansion valve 26 and the fan 29 of the unitary-side heat pump unit 20, the compressor 44 and the expansion valve 46 of the binary-side heat pump unit 40 and the like.

This, for example, makes the compressors 24 and 44 variable in rotation frequency according to an output signal from the ECU 60, and also makes adjustable the evaporation temperatures of the refrigerants of the unitary-side and binary-side heat pump units 20 and 40. The expansion valves 26 and 46 are variable in discharge opening degree according to an output signal from the ECU 60. The flow-rate adjusting valve 19 is properly adjustable in flow rate of the heat media according to an output signal from the ECU 60 between the first heat-medium circulation passage 12a and the second heat-medium circulation passage 12b.

Activation of the heat pump-type heating device according to the first embodiment thus configured will be described below.

The ECU 60 is used to vary the rotation frequency of the compressor 44 of the binary-side heat pump unit 40 so that the evaporation temperature of the refrigerant in the binary-side heat pump unit 40 is higher than the evaporation temperature of the refrigerant in the unitary-side heat pump unit 20.

Figure 2:
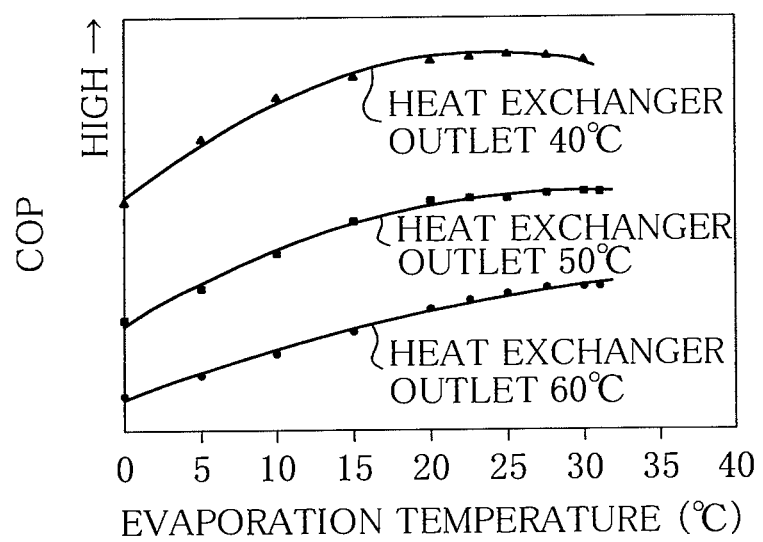
FIG. 2 shows a relationship between evaporation temperature of a refrigerant in a binary-side heat pump unit and COP of the heat pump-type heating device.

FIG. 2 shows as a simulation result a relationship between the evaporation temperature of the refrigerant in the binary-side heat pump unit 40 and the COP of the heat pump-type heating device in cases where simulations are performed on the condition that refrigerant temperatures at an outlet of the first heat exchanger 16 (heat exchanger outlet) are set to 40, 50 and 60 degrees centigrade. Referring to FIG. 2, it is evident that the COP is high in a range where the evaporation temperature is equal to or lower than a critical point (for example, 30 degrees centigrade) and equal to or higher than predetermined temperature (for example, 15 degrees centigrade or higher, or preferably, 20 degrees centigrade or higher).

In such a range, the rotation frequency of the compressor 44 of the binary-side heat pump unit 40 is controlled so that the evaporation temperature of the refrigerant in the binary-side heat pump unit 40 falls in a predetermined temperature range (for example, 15 degrees centigrade or higher, or preferably, 20 degrees centigrade or higher). To be more specific, when the evaporation temperature of the refrigerant in the binary-side heat pump unit 40 is higher than the predetermined temperature range, the evaporation temperature is reduced by raising the rotation frequency of the compressor 44. When the evaporation temperature of the refrigerant is lower than the predetermined temperature range, the evaporation temperature is increased by reducing the rotation frequency of the compressor 44. The opening degree of the expansion valve 46 may be accordingly controlled.

Figure 3:
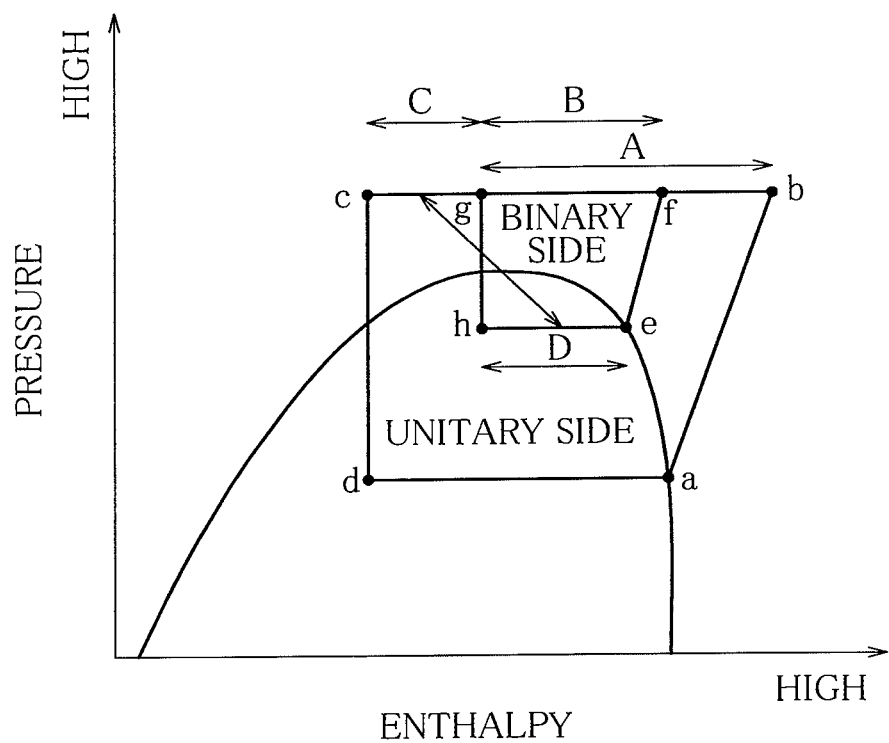
FIG. 3 is a Mollier chart related to the first embodiment.

FIG. 3 is a Mollier chart related to the present embodiment. The heat cycle of the unitary-side heat pump unit 20 is shown by a→b→c→d, and that of the binary-side heat pump unit 40 by e→f→g→h. As shown in this figure, in the heat pump-type heating device of the invention, the heat cycle of the binary-side heat pump unit 40 overlaps that of the unitary-side heat pump unit 20. The heat quantity obtained to be used for heating purpose is the sum of the heat quantity obtained by the unitary-side heat pump unit 20 (arrow A) and that obtained by the binary-side heat pump unit 40 (arrow B). FIG. 3 further shows residual heat quantity (arrow C) that cannot be used directly for heating purpose due to its low temperature but has higher temperature than outside air temperature (which is a heat absorption source of the unitary-side heat pump unit 20 and is, for example, zero degree centigrade). If the evaporation temperature of the refrigerant in the binary-side heat pump unit 40 is controlled to fall in a predetermined temperature range, the residual heat quantity can be turned into a heat absorption quantity (arrow D) of the binary-side heat pump unit 40 by using the cascade heat exchanger 25. This way, the heat that cannot be used directly for heating purpose but has higher temperature than outside air temperature is well recovered and used for heating purpose.

According to the heat pump-type heating device of the first embodiment of the invention, the high pressure-side sections of the unitary-side and binary-side heat pump units 20 and 40 are combined to be activated within substantially identical pressure ranges of supercritical pressure in the configuration using the $CO_2$ refrigerant. As a result, both the unitary-side and binary-side heat pump units can create high temperature and thus improve heating performance. In the binary-side heat pump unit 40, moreover, the heat absorption source is the residual heat that cannot be used directly for heating purpose in the unitary-side heat pump unit 20 but has higher temperature than outside air temperature. A compression ratio is therefore reduced as compared to the case in which outside air is used as a heat absorption source. The COP is consequently well improved.

Figure 4:
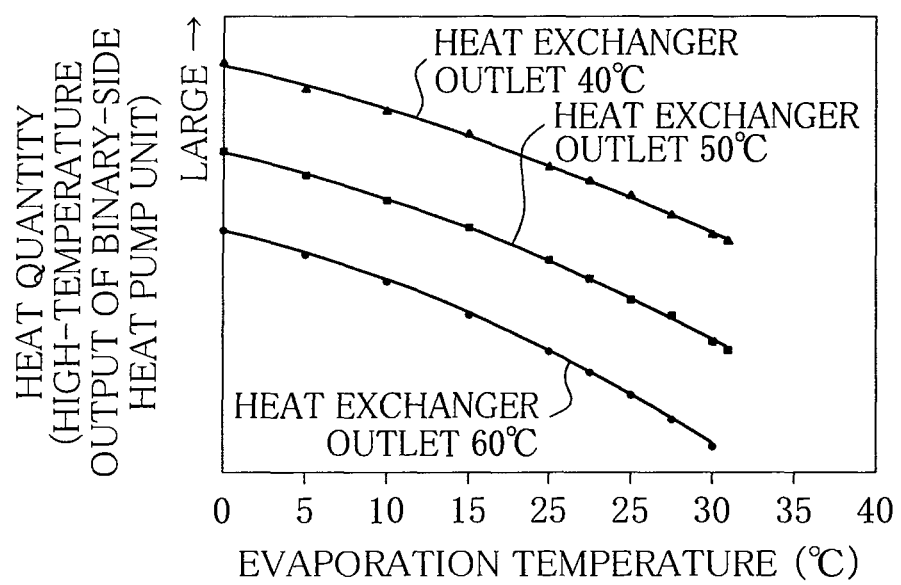
FIG. 4 shows a relationship between evaporation temperature of a refrigerant in a binary-side heat pump unit and heat quantity (high temperature output of the binary-side heat pump unit).

FIG. 4 shows a relationship between evaporation temperature of the refrigerant in the binary-side heat pump unit 40 and heat quantity (high-temperature output of the binary-side heat pump unit 40) in the case where simulations are performed on the condition that refrigerant temperatures at an outlet of the first heat exchanger 16 (heat exchanger outlet) are set to 40, 50 and 60 degrees centigrade. FIG. 4 shows that the heat quantity is reduced as the evaporation temperature is increased.

To prioritize COP improvement, the evaporation temperature of the refrigerant in the binary-side heat pump unit 40 is controlled to fall in the predetermined temperature range (for example, 15 degrees centigrade or higher, or preferably 20 degrees centigrade or higher) as described above. At same time, for example, in a situation where the heating performance is insufficient as seen immediately after the heating is started, the heating performance is prioritized. In other words, instead of being limited in the above-mentioned predetermined temperature range, the evaporation temperature of the refrigerant in the binary-side heat pump unit 40 is reduced to lower temperature than the predetermined temperature range within a temperature range higher than outside air temperature, for example, during a predetermined period.

As a consequence, even in the situation where the heating performance is insufficient as seen immediately after the heating is started, since the evaporation temperature of the refrigerant in the binary-side heat pump unit 40 is reduced to a temperature lower than the predetermined temperature range, the heating performance can be sufficiently secured while minimizing efficiency deterioration.

Second Embodiment

Figure 5:
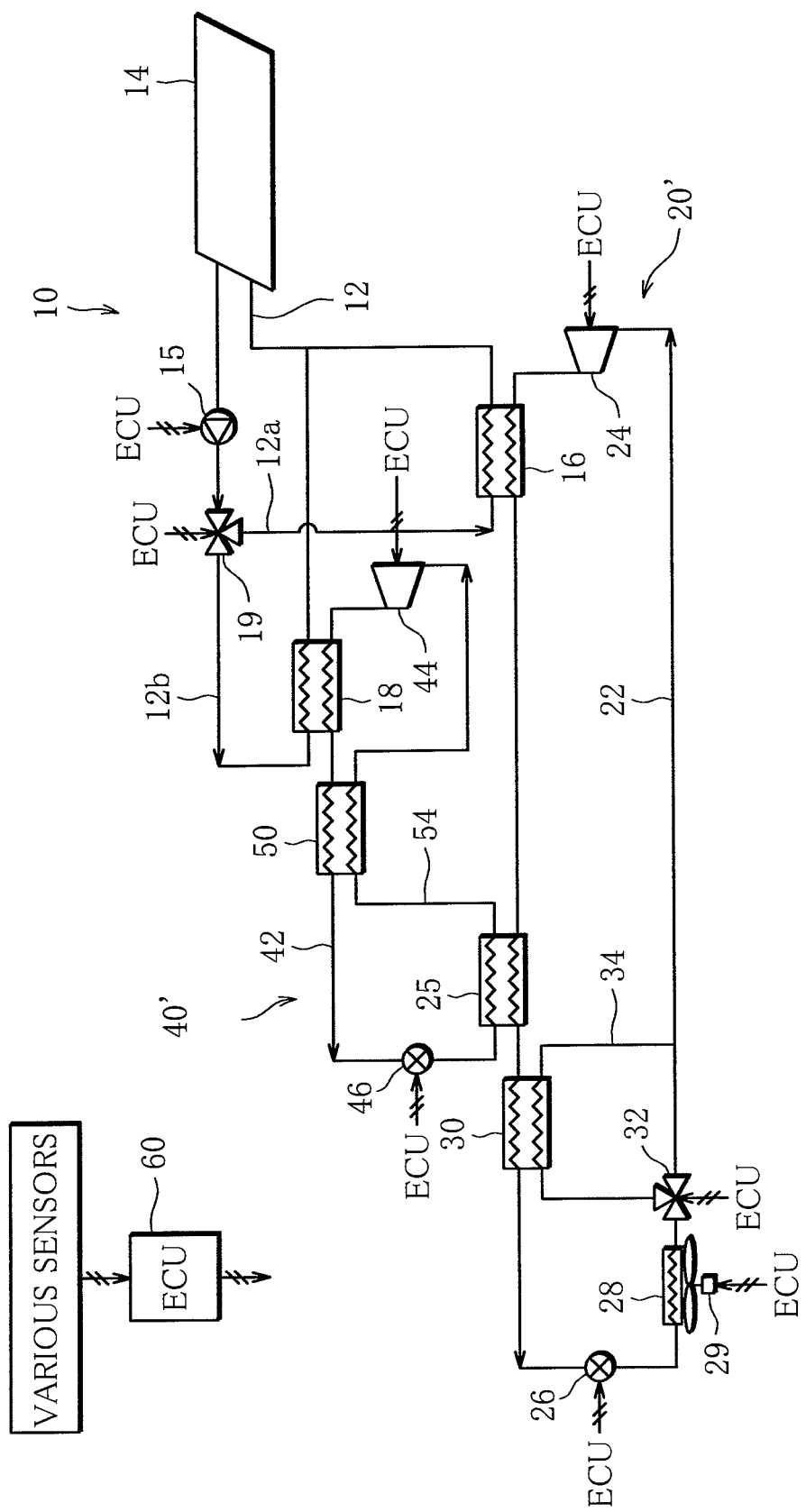
FIG. 5 is a schematic configuration view showing a heat pump-type heating device according to a second embodiment of the present invention.

FIG. 5 is a schematic configuration view showing a heat pump-type heating device according to a second embodiment of the invention.

The heat pump-type heating device of the second embodiment differs from that of the first embodiment in that a unitary-side heat pump unit 20' and a binary-side heat pump unit 40' are provided with internal heat exchangers 30 and 50, respectively.

More specifically, in the unitary-side heat pump unit 20', the internal heat exchanger (unitary-side internal heat exchanging device) 30 is disposed on the refrigerant circulation passage 22 to be interposed between the cascade heat exchanger 25 and the expansion valve 26. A linear three-way valve (controller) 32 is disposed downstream of the evaporator 28. An internal circulation passage 34 is so formed as to diverge from the linear three-way valve 32 and join the refrigerant circulation passage 22 again. The internal heat exchanger 30 is disposed on the internal circulation passage 34. The linear three-way valve 32 is electrically connected to the output side of the ECU 60.

In the binary-side heat pump unit 40', the internal heat exchanger (binary-side internal heat exchanging device) 50 is disposed on the refrigerant circulation passage 42 to be interposed between the second heat exchanger 18 and the expansion valve 46. The internal circulation passage 54 is so formed as to diverge from a downstream position of the cascade heat exchanger 25 and join the refrigerant circulation passage 42 again. The internal heat exchanger 50 is disposed on the internal circulation passage 54.

In the downstream of the compressor 24 of the refrigerant circulation passage 22 of the unitary-side heat pump unit 20', there is disposed a temperature sensor (temperature detecting device) 62 that detects temperature T of the refrigerant compressed by the compressor 24. The temperature sensor 62 is electrically connected to the ECU 60.

Figure 6:
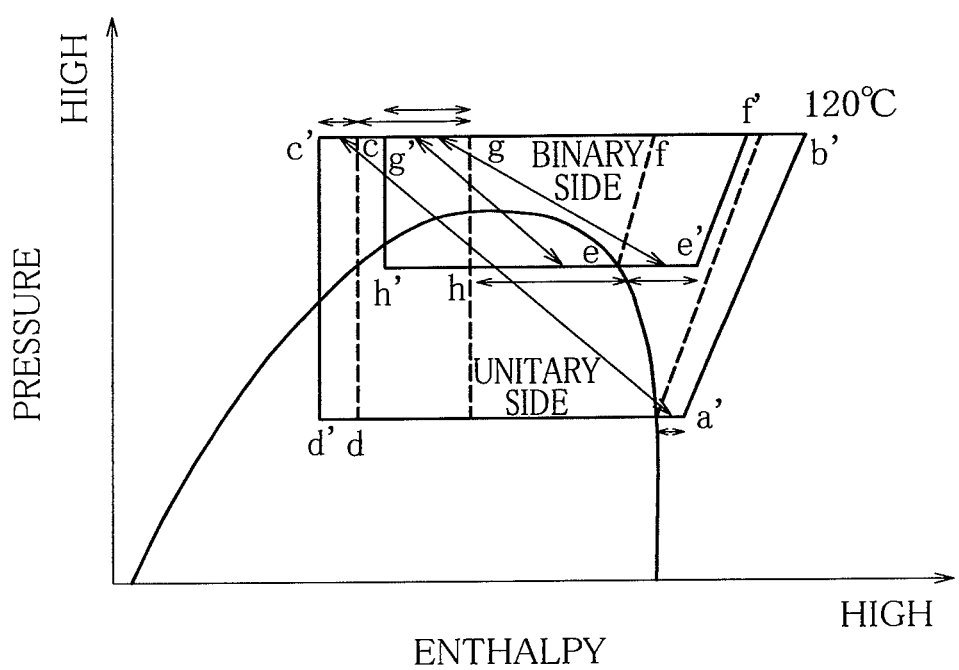
FIG. 6 is a Mollier chart related to the second embodiment.

FIG. 6 is a Mollier chart related to the second embodiment. Comparing the second embodiment with the first shown in FIG. 3, the heat cycle of the unitary-side heat pump unit 20' is shown by a'→b'→c'→d' because the refrigerant is overheated by the internal heat exchanger 30, and the heat cycle of the binary-side heat pump unit 40' is shown by e'→f'→g'→h' because the refrigerant is overheated by the internal heat exchanger 50.

In this process, the ECU 60 controls the opening degree of the linear three-way valve 32 and thus adjusts the flow rate of the refrigerant flowing through the internal circulation passage 34 so that the temperature T in the downstream side of the compressor 24 of the unitary-side heat pump unit 20' becomes predetermined temperature T1 (for example, 120 degrees centigrade) according to the temperature sensor 62. A reason for setting the temperature T in the downstream side of the compressor 24 to the predetermined temperature T1 is to prevent the device from being damaged when the refrigerant existing downstream of the compressor 24 is abnormally overheated.

In the binary-side heat pump unit 40', since the evaporation temperature is high, outlet temperature of the compressor 44 is not increased even if inlet temperature of the compressor 44 is increased. It is not particularly necessary to regulate the flow rate of the refrigerant flowing through the internal circulation passage 54, and internal heat exchange may be carried out as much as possible. However, if the binary-side heat pump unit 40' is activated with the evaporation temperature decreased, the flow rate of the refrigerant flowing through the internal circulation passage 54 may be adjusted as with the unitary-side heat pump unit 20'.

According to the heat pump-type heating device of the second embodiment of the invention, in the configuration using the $CO_2$ refrigerant, the high pressure-side sections of the unitary-side heat pump unit 20' and the binary-side heat pump unit 40' are combined to be activated within substantially identical pressure ranges of supercritical pressure, and the internal heat exchange is carried out between the refrigerants in the unitary-side and binary-side heat pump units 20' and 40'. As a result, the heating performance and thus the COP can be further improved.

Third Embodiment

Figure 7:
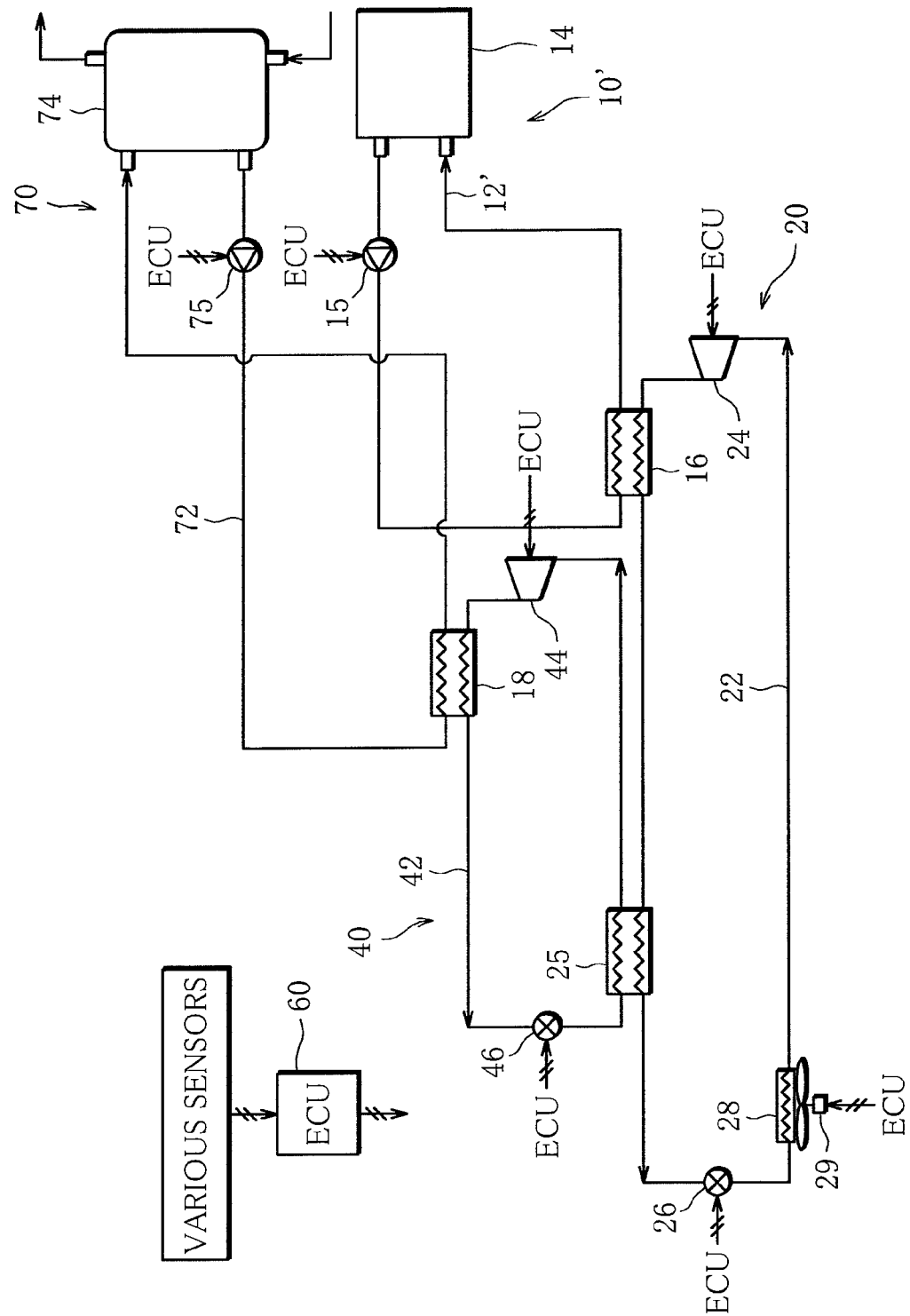
FIG. 7 is a schematic configuration view showing a heat pump-type heating device according to a third embodiment of the present invention.

FIG. 7 is a schematic configuration view showing a heat pump-type heating device according to a third embodiment of the invention.

The heat pump-type heating device of the third embodiment differs from that of the first embodiment in that not only the heating unit 10' but also a hot-water supply unit (thermal unit) 70 is provided.

As shown in FIG. 7, the heating unit 10' is configured so that, on a heat-medium circulation passage 12' through which heat media circulate, the heating terminal 14, the heat-medium circulation pump 15, and the first heat exchanger 16 that carries out heat exchange with the unitary-side heat pump unit 20 are disposed in order of a direction the media flow as shown by solid arrows.

The hot-water supply unit 70 is configured so that, on a heat-medium circulation passage 72 through which water circulates, a hot-water supply tank 74, a water circulation pump 75, and the second heat exchanger 18 that carries out heat exchange with the binary-side heat pump unit 40 are disposed in order of a direction the water flows as shown by solid arrows.

In short, the third embodiment uses the unitary-side heat pump unit 20 to perform heating, and uses the binary-side heat pump unit 40 to heat the water in the hot-water tank 74.

According to the heat pump-type heating device of the third embodiment of the invention, in the configuration using the $CO_2$ refrigerant, the high pressure-side sections of the unitary-side and binary-side heat pump units 20 and 40 are combined to be activated within substantially identical pressure ranges of supercritical pressure, and it is thus possible to perform heating by using the unitary-side heat pump unit 20 and heat the water in the hot-water supply tank 74 by using the binary-side heat pump unit 40. In this case, the heat media circulating through the heating unit 10' and the heat media circulating through the hot-water supply unit 70 can be set to have different temperatures according to an operating condition of the unitary-side and binary-side heat pump units 20 and 40 and that of the heating unit 10' and the thermal unit 70.

The hot-water supply unit 70 is supplied with low-temperature water, which has substantially the same temperature as outside air temperature, in the hot-water tank 74. The low-temperature water is heated by the second heat exchanger 18 and stored in the hot-water tank 74 as high-temperature water. This high-temperature water is used for hot-water supply.

Considering the foregoing, it can be said that the quantity of the heat exchanged between the refrigerant and the low-temperature water in the second heat exchanger 18 is far larger than the quantity of the heat exchanged between the refrigerant and the heat media in the first or second embodiment.

Figure 8:
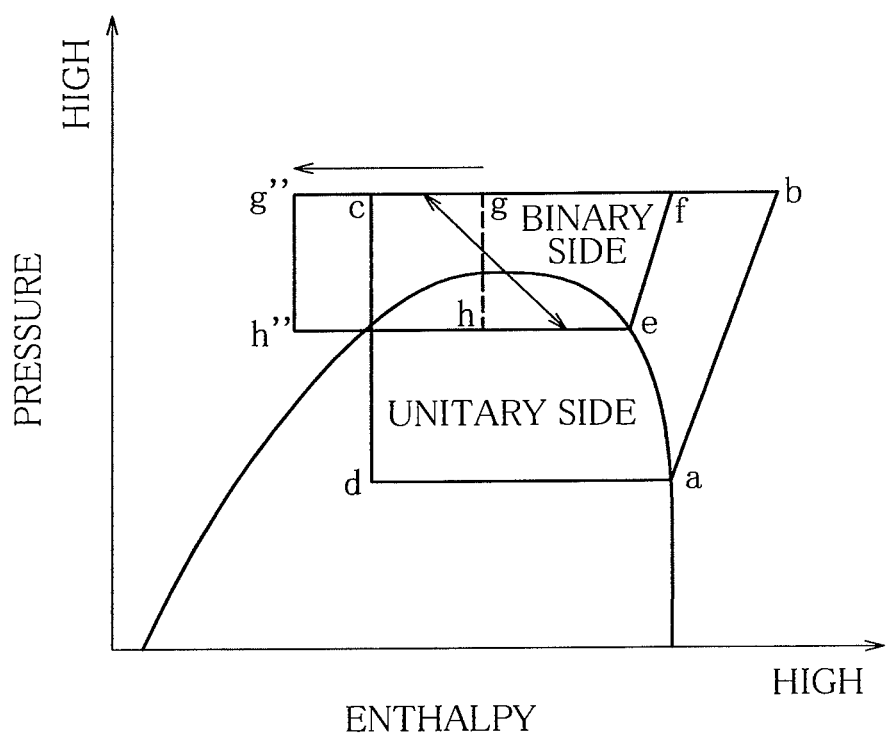
FIG. 8 is a Mollier chart related to the third embodiment.

Referring to FIG. 8 of a Mollier chart related to the third embodiment, therefore, comparing the third embodiment with the first shown in FIG. 3, especially a heat cycle of the binary-side heat pump unit 40 of the third embodiment is shown by e→f→g"→h". In other words, in the present embodiment, the enthalpy difference becomes large during the heat cycle of the binary-side heat pump unit 40, and thus, the water in the hot-water tank 74 can be efficiently heated while heating is performed.

According to the heat pump-type heating device of the third embodiment of the invention, the heating performance and the hot-water supply efficiency are enhanced, and the COP of the device is overall further improved at the same time.

If the heating unit 10 is used to circulate the heat media heated by the first and second heat exchangers 16 and 18 as in the first and second embodiments, the high pressure-side sections (first and second heat exchangers 16 and 18) of the unitary side and the binary side are activated under the same pressure because the heat media returning from the heating unit 10 to the first heat exchanger 16 and the heat media returning to the second heat exchanger 18 have the same temperature. As in the third embodiment, however, for example, if the heating unit 10' and the hot-water supply unit 70 are connected to the unitary side and the binary side, respectively, the temperature of the heat media returning from the heating unit 10 to the first heat exchanger 16 and that of the heat media returning from the hot-water supply unit 70 to the second heat exchanger 18 are not always the same. When this happens, if it is attempted to optimize the COP of the unitary side and that of the binary side, the pressure of the high pressure-side section (first heat exchanger 16) of the unitary side and that of the high pressure-side section (second heat exchanger 18) of the binary side sometimes differ from each other.

Figure 9:
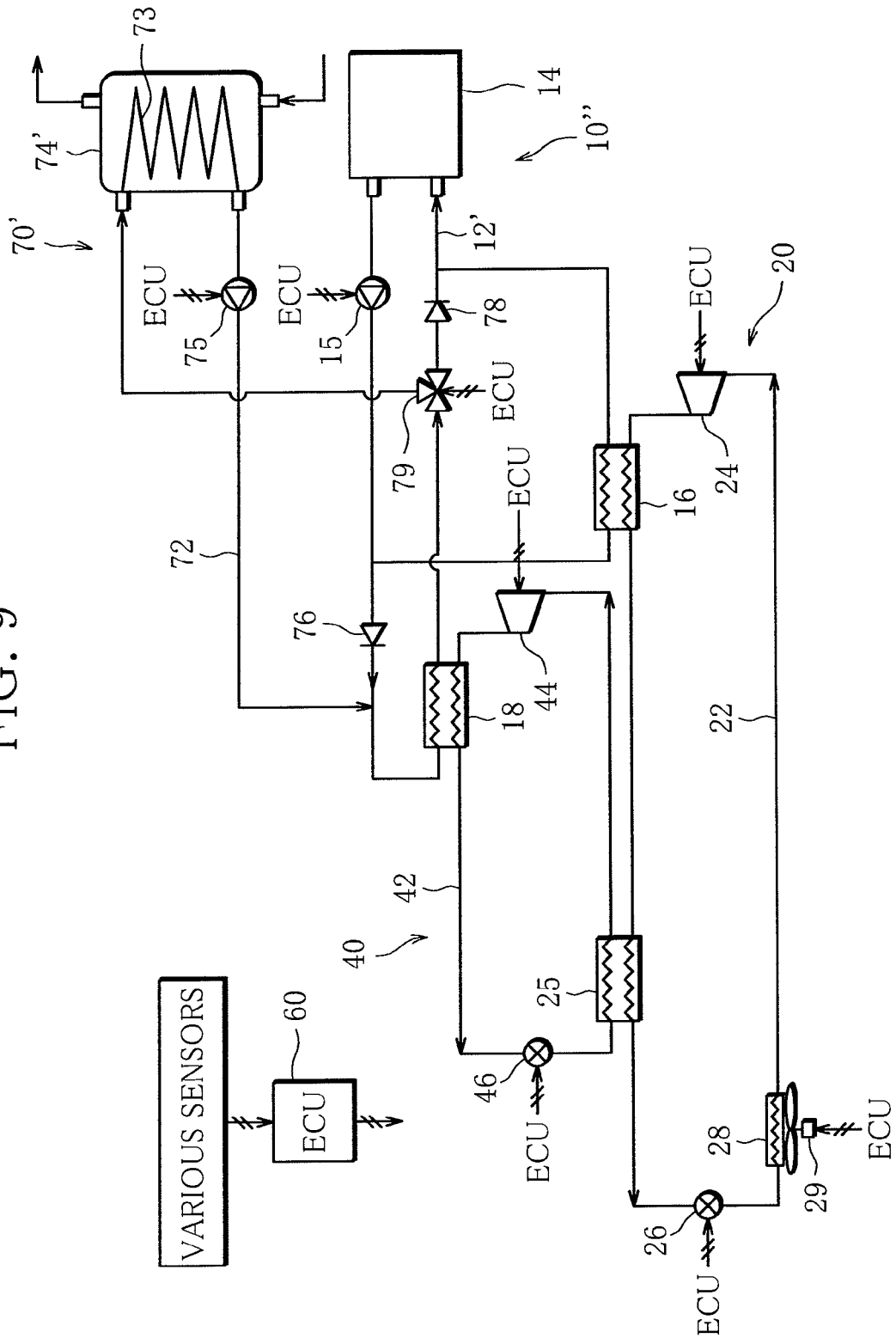
FIG. 9 is a schematic configuration view showing a heat pump-type heating device according to the third embodiment of the present invention.
Figure 10:
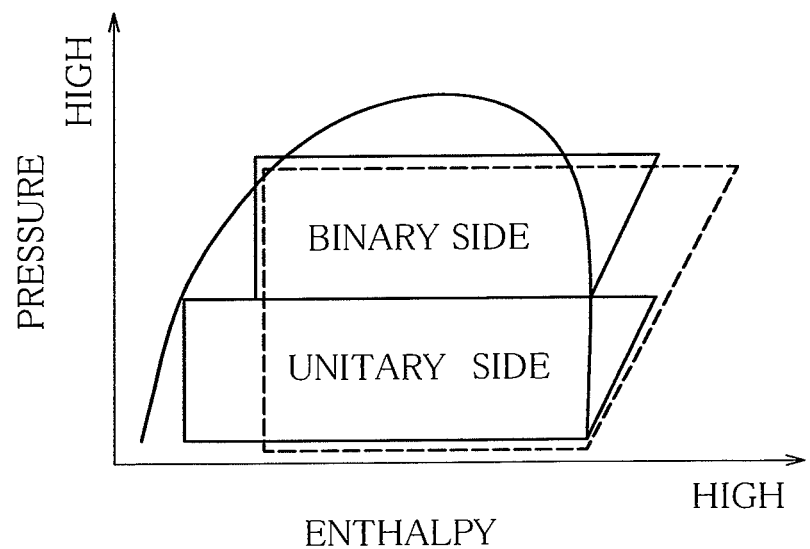
FIG. 10 is a conventional common Mollier chart of a binary compression refrigeration circuit.
Figure 11:
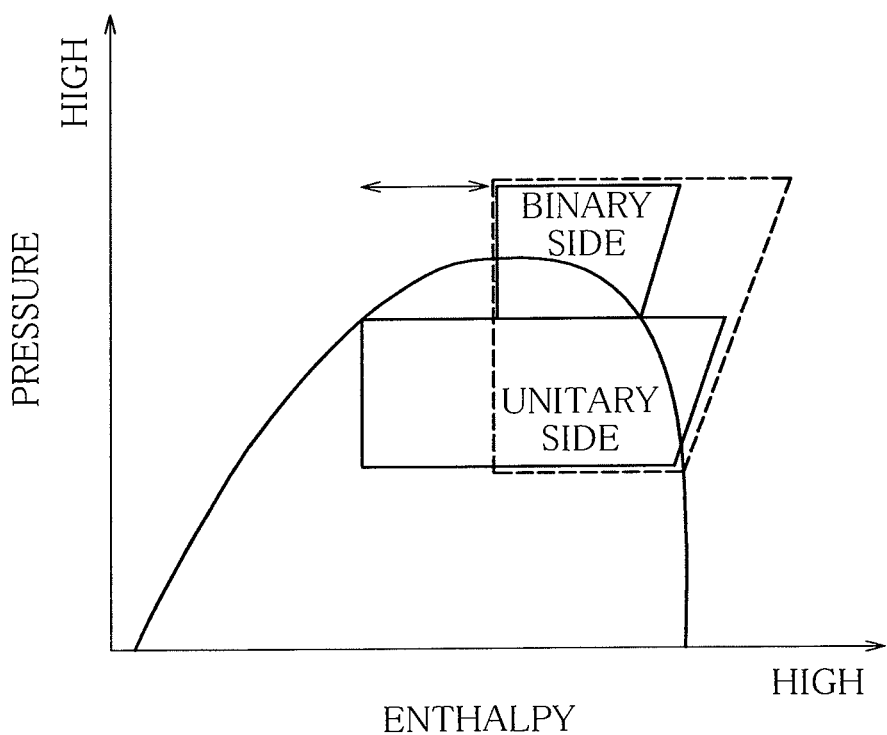
FIG. 11 is a conventional common Mollier chart related to a case where $CO_2$ is used as refrigerant in a binary compression refrigeration circuit.

FIG. 9 is a schematic configuration view showing a heat pump-type heating device according to a modification example of the third embodiment of the invention.

The heat pump-type heating device according to the modification example of the third embodiment differs from the third embodiment in that a heating unit 10" and a hot-water supply unit 70' are configured so that the heat absorbed from the refrigerant of the binary-side heat pump unit 40 through the second heat exchanger 18 can be divided into heat to be used for heating purpose and that to be used to heat the water in a hot-water tank 74', and that a third heat exchanger 73 that carries out heat exchange between water in the hot-water tank 74' and heat media. In this specification, the heat media flowing through the hot-water unit 70' are the same as those flowing through the heating unit 10".

More specifically, according to the modification example, the heating unit 10" and the hot-water unit 70' are configured so that a portion of a heat-medium circulation passage 12', which is located immediately upstream from the first heat exchanger 16, communicates with a portion of the heat-medium circulation passage 72, which is located immediately upstream from the second heat exchanger 18, via a check valve 76, and that a portion of the heat-medium circulation passage 12', which is located immediately downstream from the first heat exchanger 16, communicates with a portion of the heat-medium circulation passage 72, which is located immediately downstream from the second heat exchanger 18, via a linear three-way valve (controller) 79 and a check valve 78. The check valve 76 allows the heat media to circulate from the heat-medium circulation passage 12' to the heat-medium circulation passage 72, whereas the check valve 78 allows the heat media to circulate from the heat-medium circulation passage 72 to the heat-medium circulation passage 12'.

The linear three-way valve 79 is connected to the ECU 60 and switched according to information about the heating and the hot-water supply, which is transferred from the ECU 60. The heat media that have passed through the second heat exchanger 18 are then divided between the heating terminal 14 and the hot-water supply tank 74' at a proper ratio.

For example, if the linear three-way valve 79 is controlled so that the heat media that have passed through the second heat exchanger 18 flow to the heating terminal 14 only, the unitary-side and binary-side heat pump units 20 and 40 can be used for heating purpose. If the linear three-way valve 79 is controlled so that the heat media that have passed through the second heat exchanger 18 flow to the heating terminal 14 and the hot-water tank 74', the water in the hot-water supply tank 74' can be heated by using the binary-side heat pump unit 40 while heating is performed by using the unitary-side and binary-side heat pump units 20 and 40.

As described above, the heat pump-type heating device according to the modification example of the third embodiment of the invention makes it possible to extensively control the heat quantity of the heat media circulating through the heating unit 10", and in particular, increase the performance of the heating unit 10", by using the heat from the unitary-side heat pump unit 20 and that from the binary-side heat pump unit 40.

If the linear three-way valve 79 is controlled so that the heat media that have passed through the second heat exchanger 18 flow to the hot-water tank 74' only, it becomes possible to perform heating by using the unitary-side heat pump unit 20 and satisfactorily heat the water in the hot-water supply tank 74' by using the binary-side heat pump unit 40.

Embodiments of the heat pump-type heating device of the invention have been described with referring to the first to third embodiments and the modification example of the third embodiment, but the invention is not limited to the above-described embodiments.

For example, in the embodiments, the refrigerants circulating through the unitary-side heat pump units 20 and 20' and the binary-side heat pump units 40 and 40' are used as $CO_2$ refrigerants. However, the refrigerants are not limited to $CO_2$ refrigerants, and may be refrigerants consisting primarily of $CO_2$ as long as the refrigerants function to activate the high pressure-side sections of the refrigerant circuits within substantially identical pressure ranges of supercritical pressure.

According to the embodiments, the second embodiment includes the unitary-side heat pump unit 20' and the binary-side heat pump unit 40', which are provided with the internal heat exchangers 30 and 50, respectively. Instead, the second embodiment may include only the binary-side heat pump unit 40' provided with the internal heat exchanger 50 only.

According to the embodiments, in the third embodiment and the modification example of the third embodiment, the hot-water supply units 70 and 70' are added into the configuration of the first embodiment that includes the unitary-side and binary-side heat pump units 20 and 40. Instead, the hot-water supply units 70 and 70' may be added into the configuration of the second embodiment that includes the unitary-side and binary-side heat pump units 20' and 40'.

According to the embodiments, in the third embodiment and the modification example of the third embodiment, the hot-water supply units 70 and 70' are provided as thermal units, but the thermal units are not limited to the hot-water supply units.

Although the embodiments use outside air as the heat absorption source of the evaporator 28, earth thermal may be used instead.

EXPLANATION OF REFERENCE SIGNS

10, 10', 10" heating unit
14 heating terminal
16 first heat exchanger
18 second heat exchanger
20, 20' unitary-side heat pump unit
24, 44 compressor
25 cascade heat exchanger
26, 46 expansion valve
28 evaporator
30 internal heat exchanger (unitary-side internal heat exchanging device)
32 linear three-way valve (controller)
40, 40' binary-side heat pump unit
50 internal heat exchanger (binary-side internal heat exchanging device)
60 electronic control unit (ECU)
62 temperature sensor (temperature detecting device)
70, 70' hot-water supply unit (thermal unit)
79 linear three-way valve (controller)

The invention claimed is:

1. A heat pump-type heating device comprising:
a heating unit that circulates heat media to a heating terminal;
a unitary-side heat pump unit in which refrigerant circulates sequentially through a first compressor, a first heat exchanger, a cascade heat exchanger, a first expansion valve and an evaporator, and heat exchange with the heat media of the heating unit is carried out in the first heat exchanger;
a binary-side heat pump unit in which refrigerant circulates sequentially through a second compressor, a second heat exchanger, a second expansion valve and a cascade heat exchanger, and heat exchange with heat media of a heating unit is carried out in the second heat exchanger; and
a controller that controls the heating unit and the unitary-side and binary-side heat pump units, wherein
the refrigerants of the unitary-side and binary-side heat pump units include carbon dioxide as a main component; and
the controller activates both high pressure-side sections of the unitary-side and binary-side heat pump units within substantially identical pressure ranges of supercritical pressure.

2. The heat pump-type heating device according to claim 1, wherein the controller controls evaporation temperature of the refrigerant of the binary-side heat pump unit to be equal to or higher than evaporation temperature of the refrigerant of the unitary-side heat pump unit.

3. The heat pump-type heating device according to claim 2, wherein the controller controls the evaporation temperature of the refrigerant of the binary-side heat pump unit to be equal to or lower than a critical point and equal to or higher than predetermined temperature.

4. The heat pump-type heating device according to claim 3, wherein the predetermined temperature is 15 degrees centigrade.

5. The heat pump-type heating device according to claim 3, wherein
when heating performance of the heating unit is insufficient, the controller controls the evaporation temperature of the refrigerant of the binary-side heat pump unit to be equal to or higher than the evaporation temperature of the refrigerant of the unitary heat pump unit and lower than the predetermined temperature.

6. The heat pump-type heating device according to claim 1, wherein
the binary-side heat pump unit has a binary-side internal heat exchanging device that performs heating by carrying out heat exchange between the refrigerant that has passed through the cascade heat exchanger and the refrigerant existing between the second compressor and the second expansion valve.

7. The heat pump-type heating device according to claim 6, wherein
the unitary-side heat pump unit has a unitary-side internal heat exchanging device that performs heating by carrying out heat exchange between the refrigerant that has passed through the evaporator and the refrigerant existing between the first compressor and the first expansion valve.

8. The heat pump-type heating device according to claim 7, having a temperature detecting device that detects the temperature of the refrigerant that has passed through the first compressor, wherein
the controller controls a flow rate of the refrigerant that passes through the evaporator and undergoes the heat exchange in the unitary-side internal heat exchanging device so that the temperature of the refrigerant, which is detected by the temperature detecting device, becomes equal to predetermined temperature.

9. The heat pump-type heating device according to claim 1, wherein
in addition to the heating unit, there is provided a thermal unit that circulates the heat media, wherein
the refrigerant of the unitary-side heat pump unit undergoes heat exchange with the heat media circulating through the heating unit, whereas the refrigerant of the binary-side heat pump unit undergoes heat exchange with the heat media circulating through the thermal unit.

10. The heat pump-type heating device according to claim 9, wherein the thermal unit is a hot-water supply unit.

11. The heat pump-type heating device according to claim 1, wherein
in addition to the heating unit, there is provided a thermal unit that circulates the same heat media as the heat media of the heating unit; and
the controller circulates the heat media that have undergone heat exchange with the refrigerant of the unitary-side heat pump unit, and circulates the heat media that have undergone heat exchange with the refrigerant of the binary-side heat pump unit, after dividing the heat media between the heating unit and the thermal unit.

12. The heat pump-type heating device according to claim 11, wherein the thermal unit is a hot-water supply unit.

* * * * *